(12) United States Patent
Ramsey et al.

(10) Patent No.: US 9,058,341 B2
(45) Date of Patent: Jun. 16, 2015

(54) DEVICE AND SYSTEM FOR PROVIDING A VISUAL REPRESENTATION OF PRODUCT CONTENTS WITHIN A PACKAGE

(71) Applicants: Christopher Paul Ramsey, Wantage (GB); Laura Jane McGirr, Eglinton (GB)

(72) Inventors: Christopher Paul Ramsey, Wantage (GB); Laura Jane McGirr, Eglinton (GB)

(73) Assignee: Crown Packaging Technology, Inc., Alsip, IL (US)

( * ) Notice: Subject to any disclaimer, the term of this patent is extended or adjusted under 35 U.S.C. 154(b) by 0 days.

(21) Appl. No.: 13/827,626

(22) Filed: Mar. 14, 2013

(65) Prior Publication Data
US 2013/0240617 A1 Sep. 19, 2013

Related U.S. Application Data (60) Provisional application No. 61/611,445, filed on Mar. 15, 2012.

(51) Int. Cl.
*G06F 17/00* (2006.01)
*G06F 17/30* (2006.01)
*G06F 1/16* (2006.01)
(Continued)

(52) U.S. Cl.
CPC .... *G06F 17/30265* (2013.01); *G06F 17/30879* (2013.01); *G06F 1/1626* (2013.01); *G06F 3/005* (2013.01); *G06F 2203/04806* (2013.01); *G06T 11/00* (2013.01)

(58) Field of Classification Search
CPC ................. A01B 12/006; G06F 3/005; G06F 2203/04806; G06T 11/00
USPC ................... 235/375, 435, 436, 454, 462.01, 235/462.08, 462.09, 462.11, 462.31, 235/462.41, 470, 472.02, 487
See application file for complete search history.

(56) References Cited

U.S. PATENT DOCUMENTS 5,939,699 A 8/1999 Perttunen et al.
6,155,409 A 12/2000 Hettinger
(Continued)

FOREIGN PATENT DOCUMENTS

DE 10 2009-02786 1/2011
EP 1560009 8/2005
(Continued)

OTHER PUBLICATIONS

English Translation of Japanese Application No. 2011-016546, dated Jan. 27, 2011, 58 pages.
(Continued)

*Primary Examiner* — Kristy A Haupt
(74) *Attorney, Agent, or Firm* — Baker & Hostetler LLP (57) ABSTRACT

A method and an associated system for providing on a wireless communication device an image representing contents of a package, the method comprising the steps of reading a readable code on the package using a camera on the wireless communication device, displaying the image representing the contents of the package on the wireless communication device when the camera is positioned to view at least a portion of the package, the image being superimposed on a view of the package, and altering the image in response to relative movement between the package and the camera such that the image displayed on the wireless communication device represents the portion of the contents of the package at which the camera is pointed.

22 Claims, 7 Drawing Sheets

(51) Int. Cl.
*G06F 3/00* (2006.01)
*G06T 11/00* (2006.01)

(56) References Cited

U.S. PATENT DOCUMENTS

| | | |
|---|---|---|
| 2002/0056756 A1 | 5/2002 | Cameron et al. |
| 2002/0161640 A1 | 10/2002 | Wolfe |
| 2004/0104141 A1 | 6/2004 | Norrby et al. |
| 2005/0039092 A1 | 2/2005 | Soule et al. |
| 2006/0181510 A1 | 8/2006 | Faith |
| 2009/0089705 A1 | 4/2009 | Panabaker et al. |
| 2009/0234731 A1 | 9/2009 | Mariotti |
| 2009/0319181 A1 | 12/2009 | Khosravy et al. |
| 2010/0102117 A1 | 4/2010 | Regensburger et al. |
| 2010/0315439 A1 | 12/2010 | Huang et al. |
| 2011/0015782 A1* | 1/2011 | Chudy et al. .......... 700/237 |
| 2011/0313918 A1 | 12/2011 | Lawson et al. |

FOREIGN PATENT DOCUMENTS

| | | |
|---|---|---|
| GB | 2354360 | 3/2001 |
| GB | 2390592 | 1/2004 |
| JP | H03-100125 | 10/1991 |
| JP | H11-248552 | 9/1999 |
| JP | 2002-037420 | 2/2002 |
| JP | 2002-279268 | 9/2002 |
| JP | 2003-150745 | 5/2003 |
| JP | 2004-287037 | 10/2004 |
| JP | 2005-070725 | 3/2005 |
| JP | 2005-182416 | 7/2005 |
| JP | 2006-168735 | 6/2006 |
| WO | WO 2005/026017 | 3/2005 |
| WO | WO 2011/107895 | 9/2011 |

OTHER PUBLICATIONS

Great Britain Application No. 1220373: United Kingdom Search Report dated Mar. 27, 2013, 4 pages.

* cited by examiner

DEVICE AND SYSTEM FOR PROVIDING A VISUAL REPRESENTATION OF PRODUCT CONTENTS WITHIN A PACKAGE

CROSS-REFERENCE TO RELATED APPLICATIONS

This claims the benefit of U.S. Patent Application Ser. No. 61/611,445 filed Mar. 15, 2012, the disclosure of which is hereby incorporated by reference as if set forth in its entirety herein. This application is also related by subject matter to U.S. application Ser. No. 13/827,003, filed Mar. 14, 2013, the disclosure of which is hereby incorporated by reference as if set forth in its entirety herein.

BACKGROUND

The present application relates to methods and systems to display of images representing contents of a package. For example, the contents of a package may be a consumer product enclosed within a metal package. Metal packaging can be divided into disposable packages and durable packages. Disposable metal packages, such as food and beverage cans, may be intended to be disposed of and recycled very soon after opening. In fact, it is beneficial to recycle disposable cans for environmental reasons.

Durable metal packages, such as formed and decorated tinplate boxes for premium liquors, candy, and the like, on the other hand, are often reused. Durable metal packages also are often distinguished from disposable metal packages in that durable metal packages often have a lid that is recloseable, while disposable metal packages often have a panel that is ruptured by a score or can opener.

SUMMARY

A system and method enables a wireless communication device to provide information about a product contained in a package, preferably for providing to the holder of the wireless communication device a visual image of the product contained within a non-transparent package, and most preferably providing the perception or illusion of seeing the product through the non-transparent package.

In one embodiment, a method for providing on a wireless communication device an image representing contents of a package is provided. The method includes the steps of reading a readable code on the package using a camera on the wireless communication device, displaying the image representing the contents of the package on the wireless communication device when the camera is positioned to view at least a portion of the package, the image being superimposed on a view of the package, and altering the image in response to relative movement between the package and the camera such that the image displayed on the wireless communication device represents the portion of the contents of the package at which the camera is pointed.

In another embodiment, a system for providing on a wireless communication device an image representing contents of a package may include a package is provided. The package may include a readable code. The system may further include an application configured to run on the wireless communication device in response to the wireless communication device reading the readable code, the application further being configured to display the image representing the contents of the package on the wireless communication device when the camera is positioned to view at least a portion of the package, the image being superimposed on a view of the package and alter the image in response to relative movement between the package and the camera such that the image displayed on the wireless communication device represents the portion of the contents of the package at which the camera is pointed.

BRIEF DESCRIPTION OF THE FIGURES

The foregoing summary, as well as the following detailed description of the various embodiments of the application, will be better understood when read in conjunction with the appended drawings. For the purposes of illustrating the various embodiments of the disclosure, reference is made to the drawings. It should be understood, however, that the application is not limited to the precise arrangements and instrumentalities illustrated in the drawings, in which.

DETAILED DESCRIPTION OF PREFERRED EMBODIMENTS

A system and method for displaying an image representative of the contents of the package is disclosed. As more fully described below, the term "representative" is employed to illustrate that that the wireless communication device shows only a representation or illusory image of the product, as distinguished from providing an actual image of the product, as more fully described below.

Figure 1:
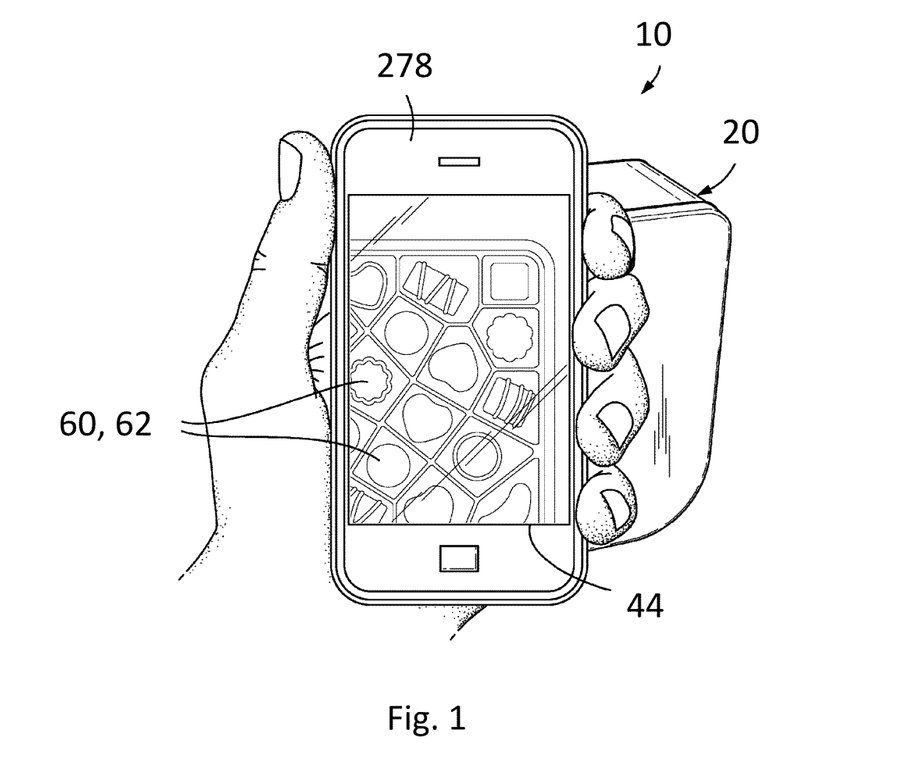
FIG. 1 is a front plan view of a system for displaying an image representing of the contents of a package.
Figure 2A:
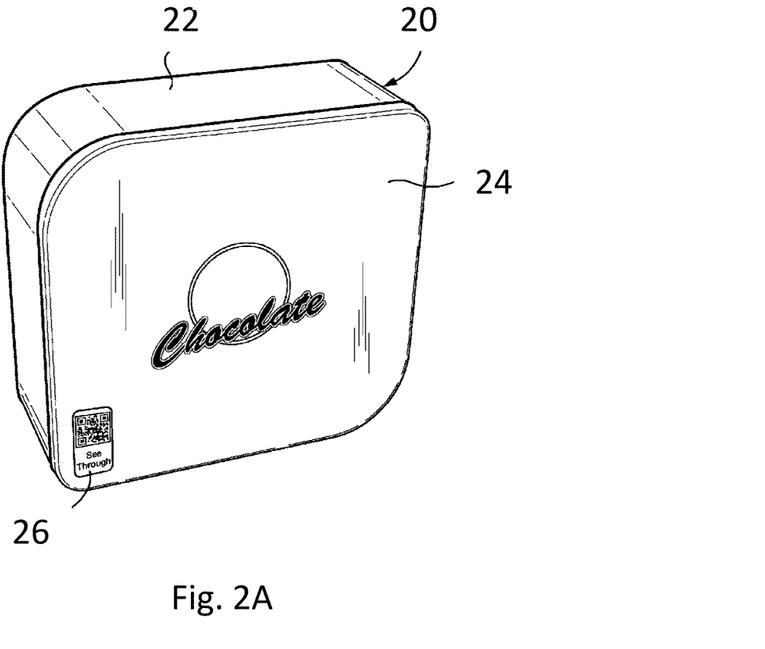
FIG. 2A is a perspective view of the package shown in FIG. 1, the package having a readable code.
Figure 2B:
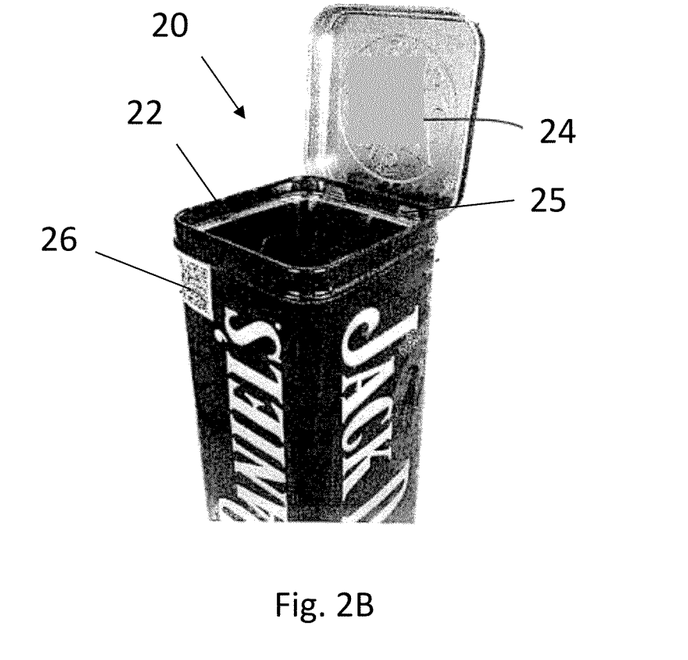
FIG. 2B is a perspective view of a package having a readable code and a hinge.

Referring to FIGS. 1, 2A, and 2B, a system 10 for displaying an image representative of the contents of a package includes a package 20 and a computing device 278 capable of performing the operations described herein, such as a wireless computing device. Package 20 preferably includes a container 21, such as a rigid metal container that may be used to package various products such as breath mints, premium liquor, premium or seasonal candies, and the like. Container 21 typically is formed of a decorated sheet steel or aluminum and may include a body 22 and a lid 24. As shown in FIG. 2B, lid 24 may be attached to body 22 by a hinge 25. Preferably, neither body 22 nor lid 24 is transparent or includes a transparent portion. Thus, preferably a product 60 contained within container 21 cannot be seen by a potential purchaser without first opening lid 24. Only the image representing of product 60 is shown in the figures (rather than the product itself).

Figure 3A:
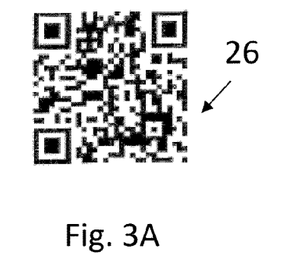
FIGS. 3A-G show different types of codes which may be applied as markings to metal packages and metal components of packages.
Figure 3B:
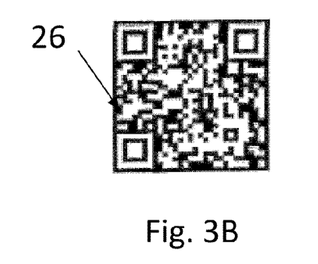
Figure 3C:
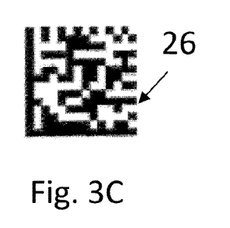
Figure 3D:
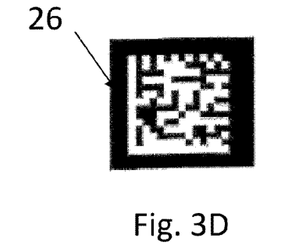
Figure 3E:
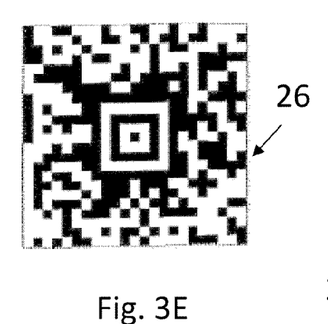
Figure 3F:
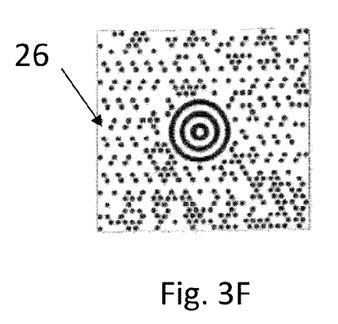
Figure 3G:
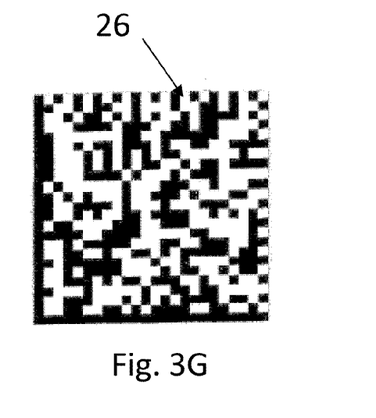

Package 20 has a readable code 26 located on it. Readable code 26 preferably is a two dimensional bar code, such as a QR code, although any other suitable codes may be used. For example, a UPC symbol or a High Capacity Color Barcode, such as a Microsoft tag, may be employed. Alternatively, a data matrix tag may be used. Examples of readable codes 212 are shown in FIGS. 3A-G. For example, FIG. 3A shows a QR code which may be scanned by the computing device 278. FIG. 3B shows an inverted QR code, which may be scanned in a similar way. Determining whether to use a QR code or an inverted QR code typically depends on the selection of inks, lacquers and other pigmented materials being applied to the package 20 as described in more detail below. FIG. 3C shows a data matrix, whilst FIG. 3D shows an inverted data matrix. Other types of readable code 212 include an Aztec code as shown in FIG. 3E, a maxicode as shown in FIG. 3F, and a semacode as shown in FIG. 3G.

Product 60 may encompass a product having multiple pieces 62, such as multiple chocolates, which may be oriented in a layer, as shown in the figures. Pieces 62 may be located in multiple approximately planar layers, not shown in the figures. The product 60 may also encompass parts of a connected system, such as parts of tool such as an electric drill or other tool that may have several connected parts. Alternatively, product 60 may encompass a single-piece product, such as a bottle of liquor.

The computing device 278 may be a wireless communication device such as a smart phone or like handheld wireless device accessible to consumers and shoppers. The computing device 278 may include a camera (not shown in the figures) and a display 44. The computing device 278 may be any device that is capable of reading the readable code 26. Display 44 encompasses any suitable visual display, and preferably is a touch screen display. In part because of the rapid cycle time, the computing devices 278 referred to herein are not intended to be limited to any particular technology.

Figure 4:
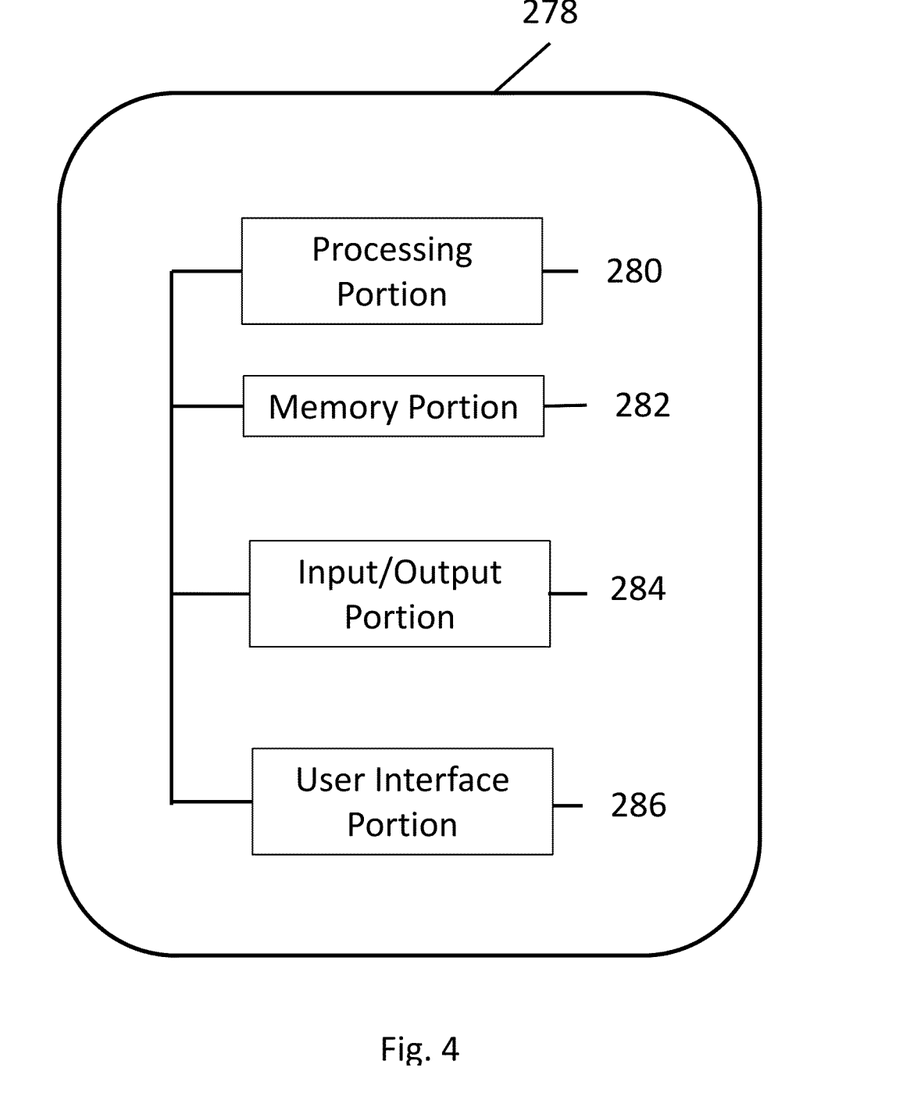
FIG. 4 is a block diagram of an example computing device for use in accordance with the present disclosure.

As shown in FIG. 4, any suitable computing device 278 may be configured to host at least part of the system 10 for displaying an image representative of the contents of a package. It should be understood that the computing device 278 can include any appropriate device, examples of which include a laptop computer, smart phone, or the like.

In an example configuration, the computing device 278 includes a processing portion 280, a memory portion 282, an input/output portion 284, and a user interface (UI) portion 286. It is emphasized that the block diagram depiction of computing device 278 is exemplary and not intended to imply a specific implementation and/or configuration. The processing portion 280, memory portion 282, input/output portion 284 and user interface portion 286 can be coupled together to allow communications therebetween. Computing device 278, for example, may be an iPhone™ operating iOS 6™ or equal. The steps performed may be controlled by an "app" or "application," as that term is understood with people familiar with wireless communication devices, operation, and architecture.

In various embodiments, the input/output portion 284 includes a receiver of the computing device 278, a transmitter of the computing device 278, or a combination thereof. The input/output portion 284 is capable of receiving and/or providing information pertaining to communicate a network such as, for example, the Internet. Transmit and receive functionality may also be provided by one or more devices external to the computing device 278.

Depending upon the exact configuration and type of processor, the memory portion 282 can be volatile (such as some types of RAM), non-volatile (such as ROM, flash memory, etc.), or a combination thereof. The computing device 278 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the computing device 278.

The computing device 278 also can contain the user interface portion 286 allowing a user to communicate with the computing device 278. The user interface 286 can include inputs that provide the ability to control the computing device 278, via, for example, buttons, soft keys, a mouse, voice actuated controls, a touch screen, movement of the computing device 278, etc. The user interface portion 286 can provide outputs, including visual information (e.g., via a display), audio information (e.g., via speaker), mechanically (e.g., via a vibrating mechanism), or a combination thereof. In various configurations, the user interface portion 286 can include a display, a touch screen, a keyboard, a mouse, an accelerometer, a motion detector, a speaker, a microphone, a camera, a tilt sensor, or any combination thereof.

Figure 5:
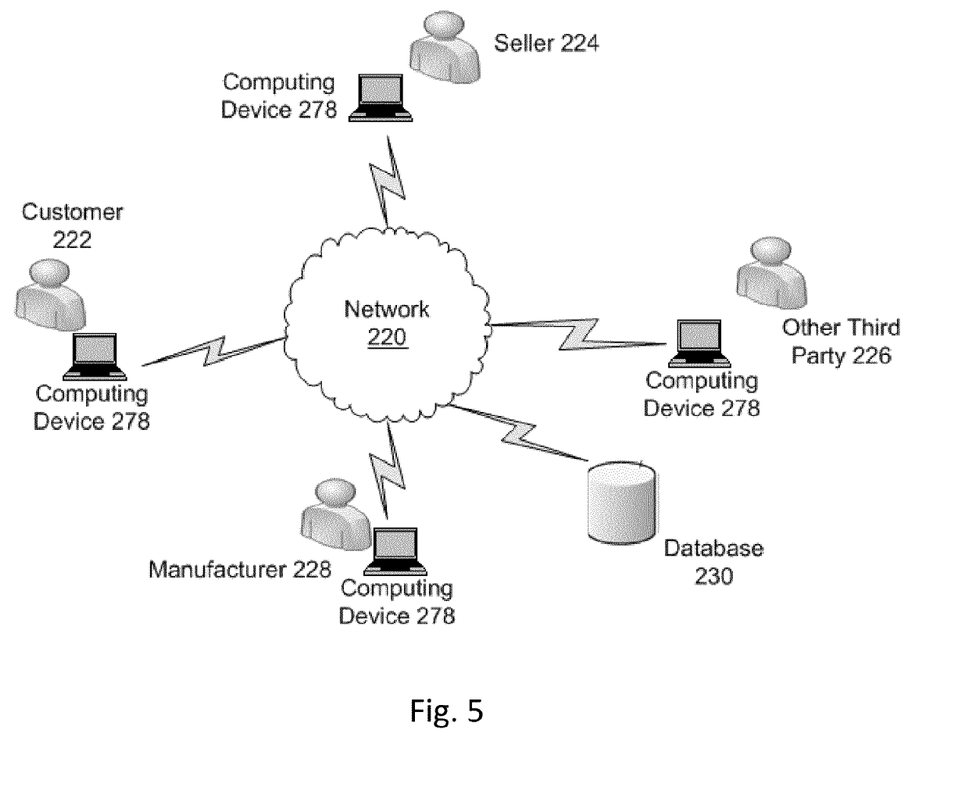
FIG. 5 is an example communication architecture for use in accordance with the present disclosure.

FIG. 5 depicts one example of a suitable communication architecture that can be used in the system 10 for displaying an image representative of the contents of a package. In addition or instead of the architecture shown in FIG. 4, numerous suitable alternative communication architectures are envisioned. Once the system 10 for displaying an image representative of the contents of a package has been installed onto the computing device 278 such as described above or possibly another device, it can transfer information between other computing devices 278 on a common network 220, such as the Internet. In an example configuration, a producer 224 may transmit via the network 220 an image representative of the contents of a package to at least one other computing device 278.

The producer 224 may be the company that produces the product (i.e., the contents) that is enclosed within of the container 21. For example, the producer 224 may receive the container 21 in a disassembled state. The producer 224 may assemble the package 20 so as to enclose the product within the container 21 and send it to a vendor or retailer for sale to the customer 222. In some embodiments, the producer 224 may also mark the readable code 212 on the package 20.

The manufacturer 228 may be the entity that forms the body 22 and lid 24 of the container 21, for example, from sheet metal. The manufacturer 228 may then send the body 22 and lid 24 in a disassembled state (e.g., unattached to one another). The manufacturer 128 may optionally mark the container 21 with the readable code 212. Alternatively, another entity, such as the producer 224 may mark the package 20 with the readable code 212.

The third party 226 may be an entity that otherwise facilitates interaction between a computing device and a package. For example, the third party 226 may be a vendor and/or retailer of the package 20. Alternatively, the third party 226 may be an entity that delivers information regarding the package 20 to customer 222 that is wholly independent from the producer 224, manufacturer 228, or other third party 226. In some embodiments, there are multiple third parties 226. Further, any combination of the producer 224, the manufacturer 228, and the third parties 226 may be part of a single entity. For example, a single company may include the producer 224 and the manufacturer 228. Alternatively, each of the producer 224, the manufacturer 228, and the third parties 226 may be separate entities.

The computing devices 278 and the database 230 depicted in FIG. 5 may be operated in whole or in part by, for example, the producer 224, the manufacturer 228, and the third parties 226, or by any combination of any of the above entities. Further, each of the parties set forth above and/or other relevant parties may operate any number of respective computers and may communicate internally and externally using any number of networks including, for example, wide area networks (WAN's) such as the Internet or local area networks (LAN's). The database 230 may be used, for example, to store information regarding product 60 contained within the container 21 of package 20. The database 230 may also be used, for example, to store information obtained from entities such as the customer 222, the seller 224, the manufacturer 228, and the third parties 226.

Figure 6:
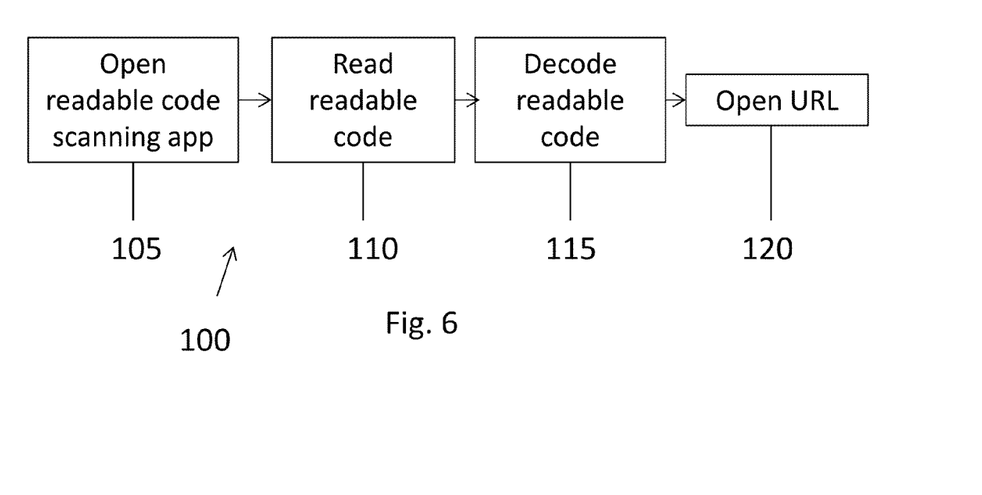
FIG. 6 is a schematic of an exemplary method for using a readable code.
Figure 7:
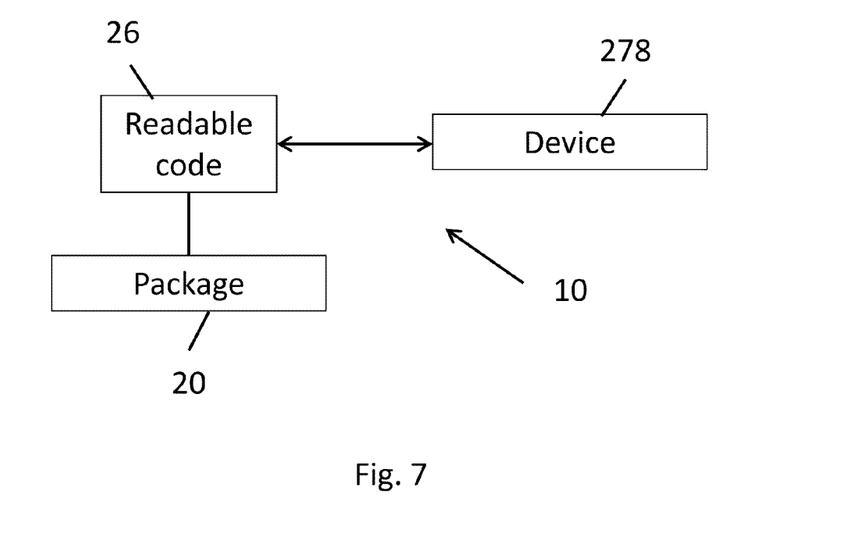
FIG. 7 is a schematic of an exemplary system for using a readable code.

Referring now to FIG. 6, a schematic is shown for the method 100 of facilitating interaction between a computing device and a package. In the first step 105, an application, such as a readable code scanning app, is opened on the computing device 278 in order to scan the readable code 212. The customer 222 may have a smart phone or other mobile device with a camera that is configured to work in conjunction with the scanning app to read the readable code 212. Or, the user may be the end user of the package 20, such as a person who receives the package 20 as a gift from the customer 222.

In a second step 110, the scanning app reads the readable code 212. In some embodiments, the scanning app may be configured to require that a user take a picture of the readable code 212. Alternative embodiments may be configured to automatically scan a readable code 212.

In a third step 115, the computing device 278 decodes the readable code 212. In a fourth step 120, the computing device 278 opens a URL encoded in the readable code 212. In one embodiment, the fourth step occurs after step 115 results in a signal being sent to a web browser on the device to open the URL.

In other embodiments, the method 100 may also or alternatively include downloading a second application or offering the user the option of downloading a second application either directly from a database 230, through the network 220, or from information structured on the computing device 278. Other embodiments may also or alternatively include automatically opening a video or offering the user the option of viewing a video. When fourth step 120 occurs, the user may access information relevant to interaction between a computing device and a package.

Figure 8:
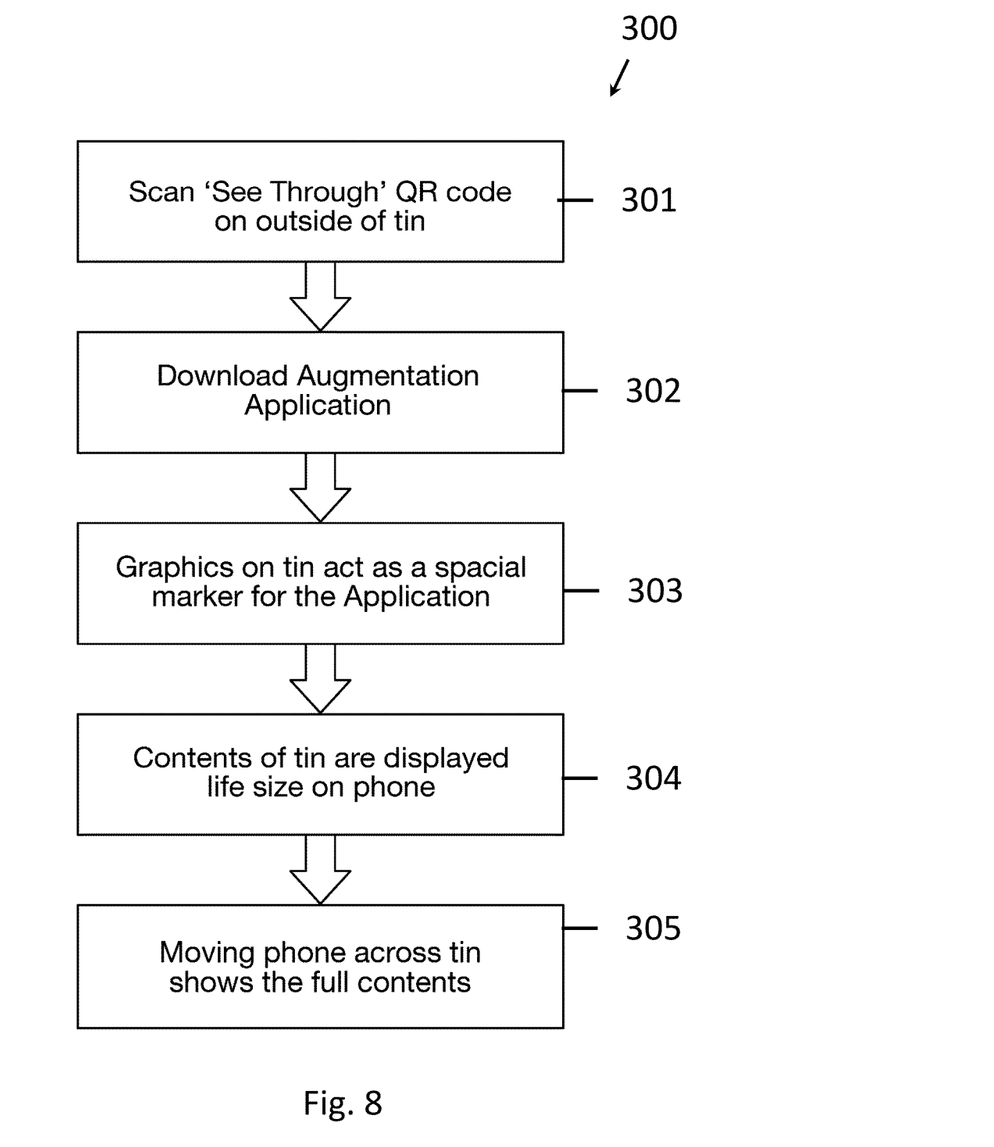
FIG. 8 is an exemplary method of displaying an image representing the contents of a package.

For example, FIG. 8 depicts an exemplary method of displaying an image representing the contents of a package. After the readable code 212 has been read at step 301, a second application may be downloaded via the network 220. At step 303, the computing device 278 renders an image representing the contents of the package 20, for example an image of the product 60, including pieces 62. The image may be an augmented illusory image of product 60 on display 44. Specifically, the image of the product 60 (i.e., the contents) may be superimposed over the live camera view of the tin. As indicated at step 304, the contents of the package 20 may appear as life-sized on the display 44. The image could either be in 2D such a photograph of the product or in 3D view so that the three dimensional form of the product is visible as the device screen is manipulated relative to the package 20. The 3D view may be textured so as to provide a life-like representation of how the product 60 will look when the package 20 is opened. Referring again to FIG. 1, the image shown reflects the portion of product 60 at which the camera of the computing device 278 is pointed.

The application may use the computing device 278 to look for a visual anchor that is on or part of package 20 as a reference to rendering the image. For example, the application and data may control the camera to recognize a logo on package 20. Upon recognizing the logo, the application can determine the relative position of the computing device 278 in relation to the package 20 and relative distance between the computing device 278 in relation to the package 20. Accordingly, the application may render an image on display 44 from the downloaded or stored data that correspond to the orientation and size of the product such that the user is given the illusion that the application is seeing through the package 20 to enable viewing of the product contents, as shown in FIG. 1.

Additional information from the package 20 can be received by the application such that the display represents a fully accurate view of the product. For example, a time or temperature indicator on the package 20 could be interpreted by the application such that if the product is past its sell by date or has been exposed to excessive temperature, the image displayed could be adjusted accordingly to show a poor quality product. Many types of sensors may be employed, for example; time, temperature, headspace gas indicator, tamper evidence. The readable code 26 may include the indicator. For example, the readable code may include an environmentally sensitive ink that changes the appearance on the readable code 26 in response to environmental conditions. Alternatively, the indicator may be located remote from the readable code.

Alternative visual anchors may be employed. For example, the overall envelope (that is, outer surfaces) of the package may be employed to register the image of the display with the package. Also, multiple anchors may be employed. And the angular relationship between the visual anchor and camera may enable the image to show a perspective view of product 60.

As indicated at step 305, the application enables the rendered image to move upon relative movement between package 20 and computing device 278. Zooming may also be enabled. Thus, in operation, upon initiation, device 40 may render an image showing the top right portion of pieces 62 within package 20, upon movement down and to the left toward the bottom left portion, display 44 would alter the displayed image to display a continuously progressing image as if camera could see through lid 24 to display pieces 62. Zooming in and out would further enhance the illusion by making the image larger or smaller.

The present application also may include controls, preferably virtual buttons located on touch screen display, to enable the illusion of seeing not only through package 20 but also through a top or several upper layers of pieces 62. In some embodiments, images representing cross sections of the product(s) may be enabled by the application.

The present invention has been described with respect to a particular embodiment and to particular technology. The present invention is not limited to the particular embodiments, details, and technology set out in this disclosure, but rather encompasses variations as will be understood by persons familiar with the packages and technology. Further, the technology is referred to without presenting commonplace details for background technology. For example, the structure and function of a smartphone, the process for downloading and initiating applications for smartphones, algorithms for rendering product data into images, and the like are well-known technology that are not set out in detail, as those technologies will be understood by persons familiar with smartphone and image processing technology.

We claim:

1. A method for providing on a wireless communication device an image representing contents of a package, the method comprising the steps of:

reading a readable code on the package using a camera on the wireless communication device;

displaying the image representing the contents of the package on the wireless communication device when the camera is positioned to view at least a portion of the package, the image being superimposed on a view of the package; and altering the image in response to relative movement between the package and the camera such that the image displayed on the wireless communication device represents the portion of the contents of the package at which the camera is pointed.

2. The method of claim 1, wherein the package is a durable package.

3. The method of claim 1 further comprising the step of downloading an application in after the scanning step, the application including data that can be rendered to produce the image.

4. The method of claim 1 wherein relative position between the camera and the package is determined by the camera viewing a visual anchor of the package.

5. The method of claim 4 wherein the anchor is an image on the package.

6. The method of claim 4 wherein the anchor is the envelope of the package.

7. The method of claim 4 wherein the product includes multiple pieces that are configured into layers, and wherein the data can be rendered to produce images representing layers within the product.

8. The method of claim 7 wherein wireless communication device displays virtual buttons, and activating the buttons moves the image to a lower layer within the product.

9. The method of claim 1 wherein the wireless communication has a touch screen display, and wherein the displaying step is performed on the touch screen display.

10. The method of claim 9 further comprising a step of displaying a piece of the product to display details of the piece.

11. The method of claim 1 further comprising the step of zooming in and out on the image to show an enlarge portion of the image.

12. The method of claim 1 wherein the image displays an altered product if this is indicated by a sensor on the pack, such as an indicator for time, temperature, headspace gas or tamper evidence.

13. A system for providing on a wireless communication device an image representing contents of a package, the system comprising:

a package, the package including a readable code; and an application configured to run on the wireless communication device in response to the wireless communication device reading the readable code, the application further being configured to:

display the image representing the contents of the package on the wireless communication device when the camera is positioned to view at least a portion of the package, the image being superimposed on a view of the package: and alter the image in response to relative movement between the package and the camera such that the image displayed on the wireless communication device represents the portion of the contents of the package at which the camera is pointed.

14. The system of claim 13, wherein the package is a durable package.

15. The system of claim 13 wherein the application is capable of receiving data in response to scanning the code, the application capable of using the data to render the image.

16. The system of claim 13 wherein the product includes multiple pieces that are configured into layers, and wherein the data can be rendered to produce images representing layers within the product.

17. The system of claim 16 wherein wireless communication device displays virtual buttons, and activating the buttons moves the image to a lower layer within the product.

18. The system of claim 16 wherein the wireless communication has a touch screen display, and wherein the displaying step is performed on the touch screen display.

19. The system of claim 16 wherein the product includes multiple pieces that are configured into layers, and wherein the data can be rendered to produce images representing layers within the product.

20. The system of claim 19 wherein wireless communication device displays virtual buttons, and activating the buttons moves the image to a lower layer within the product.

21. The system of claim 13 wherein the wireless communication has a touch screen display, and wherein the displaying step is performed on the touch screen display.

22. The system of claim 21 wherein the application is further configured to display a piece of the product to display details of the piece.

\* \* \* \* \*